(12) United States Patent
Rentschler

(10) Patent No.: US 8,875,590 B2
(45) Date of Patent: Nov. 4, 2014

(54) CRASH SIMULATION AND CRASH SIMULATION METHOD

(75) Inventor: Walter Rentschler, Althengstett (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 184 days.

(21) Appl. No.: 13/490,733

(22) Filed: Jun. 7, 2012

(65) Prior Publication Data

US 2013/0004927 A1    Jan. 3, 2013

(30) Foreign Application Priority Data

Jun. 29, 2011   (DE) .......................... 10 2011 051 423

(51) Int. Cl.
*G01N 17/00* (2006.01)
*G01M 17/007* (2006.01)

(52) U.S. Cl.
CPC ................................. *G01M 17/0078* (2013.01)
USPC ....................................................... 73/865.6

(58) Field of Classification Search
USPC ........................................................ 73/865.6
See application file for complete search history.

(56) References Cited

U.S. PATENT DOCUMENTS 6,651,482 B1 *  11/2003  Moffatt et al. ............... 73/12.12

FOREIGN PATENT DOCUMENTS

| DE | 2 20 119 | | 2/1909 |
| DE | 2 143 540 | | 3/1973 |
| DE | 220119 A | * | 3/1985 |
| DE | 34 21 546 | | 11/1985 |
| DE | 10 2009 021 686 | | 11/2010 |
| DE | 102009021686 A1 | * | 11/2010 |
| JP | 7-55645 | | 3/1995 |

* cited by examiner

*Primary Examiner* — Lisa Caputo
*Assistant Examiner* — Jamel Williams
(74) *Attorney, Agent, or Firm* — Gerald E. Hespos; Michael J. Porco; Matthew T. Hespos

(57) ABSTRACT

A crash simulation system has a parallel carriage (4) guided to move in a translatory manner and at least one camera (11-13) with an associated brake device. The brake device includes a contactless brake.

9 Claims, 3 Drawing Sheets

CRASH SIMULATION AND CRASH SIMULATION METHOD

CROSS REFERENCE TO RELATED APPLICATION

This application claims priority under 35 USC 119 to German Patent Appl. No. 10 2011 051 423.6 filed on Jun. 29, 2011, the entire disclosure of which is incorporated herein by reference.

BACKGROUND OF THE INVENTION

1. Field of the Invention

The invention relates to a crash simulation system having at least one parallel carriage that is guided synchronously so that it can move in a translatory manner, and having at least one camera. The parallel carriage has an associated brake device. The invention also relates to a method for operating a crash simulation system of this kind.

2. Description of the Related Art

German laid-open specification DE 10 2009 021 686 A1 discloses a crash simulation system of this generic type and a method for operating a crash simulation system of this kind.

The object of the invention is to improve a crash simulation system having at least one parallel carriage that is guided synchronously so that it can move in a translatory manner, and having at least one camera. A further object of the invention is to improve the operation of a crash simulation system of this kind.

SUMMARY OF THE INVENTION

The invention relates to a crash simulation system having a parallel carriage that is guided synchronously so that it can move in a translatory manner. The crash simulation system also has at least one camera and an associated brake device. The brake device comprises a contactless brake. The contactless brake operates in a contactless manner and provides the advantage that there is no initial shock with undesired brief acceleration peaks at the start of a braking process.

The contactless brake preferably is a linear eddy current brake. Thus, the camera can be braked without wear without an undesired initial shock.

The brake device may comprise at least one permanent magnet. The permanent magnet is used to generate a permanent magnetic field by virtue of which an adequate braking action can be provided even in the event of a power cut.

The brake device may comprise at least one metal, electrically conductive brake element associated with a camera carriage and movable between two permanent magnets. The permanent magnets preferably are plates and are at a distance from one another. The electrically conductive brake element can be a fin attached to the camera carriage.

A decoupling device may be connected in front of the brake device. The decoupling device is used to decouple the camera carriage from a main carriage before a braking process. The main carriage also is called a parallel carriage and preferably is moved in a different guidance system to the camera.

The brake device may comprise a mechanical and/or a hydraulic brake in addition to the contactless brake. The additional brake preferably comprises at least one hydraulic impact damper. The additional brake is used to bring the camera to a stop after it has been braked in a contactless manner. In the process, the main part of the braking action is applied by the contactless brake. The additional brake preferably is used only to bring the camera to a complete stop from a relatively slow movement state.

The invention also relates to a method for operating a crash simulation system. The method includes braking the camera in a contactless manner. Contactless braking minimizes wear during operation of the crash simulation system and avoids potentially damaging and undesired initial shocks caused by brief acceleration peaks.

The method may include decoupling the camera from the parallel carriage before braking the camera in a contactless manner. The parallel carriage also is called a main carriage and preferably is guided independently of the camera.

The method preferably includes braking the camera with the aid of at least one eddy current brake. An eddy current brake is a wear-free brake that uses eddy current losses from metal elements that are moved in magnetic fields for braking purposes.

Further advantages, features and details of the invention are in the following detailed description of exemplary embodiments with reference to the drawing.

BRIEF DESCRIPTION OF THE DRAWINGS

FIG. 1 is a front view of a crash simulation system according to the invention in.

DETAILED DESCRIPTION OF THE PREFERRED EMBODIMENTS

Figure 1:
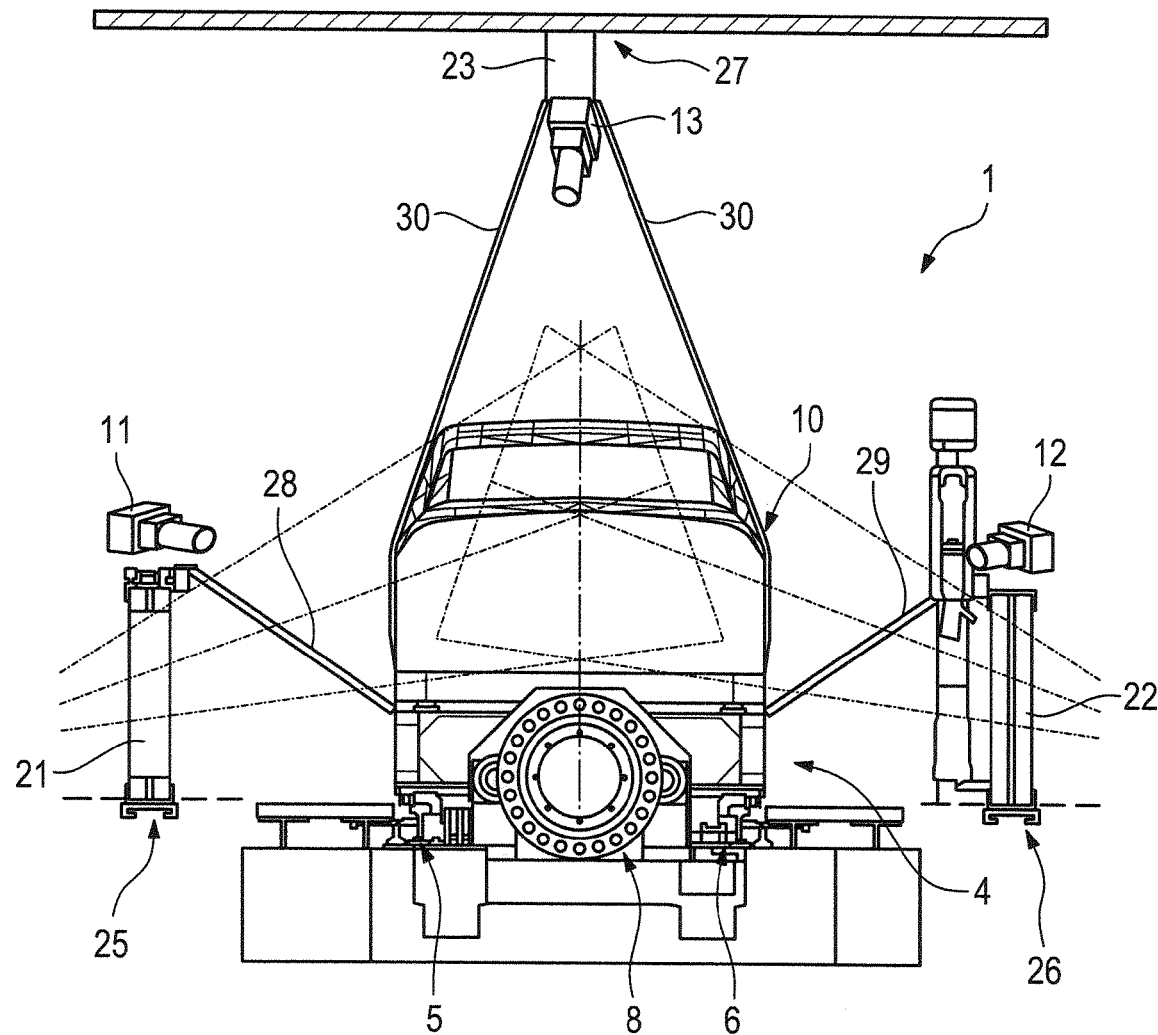
Figure 2:
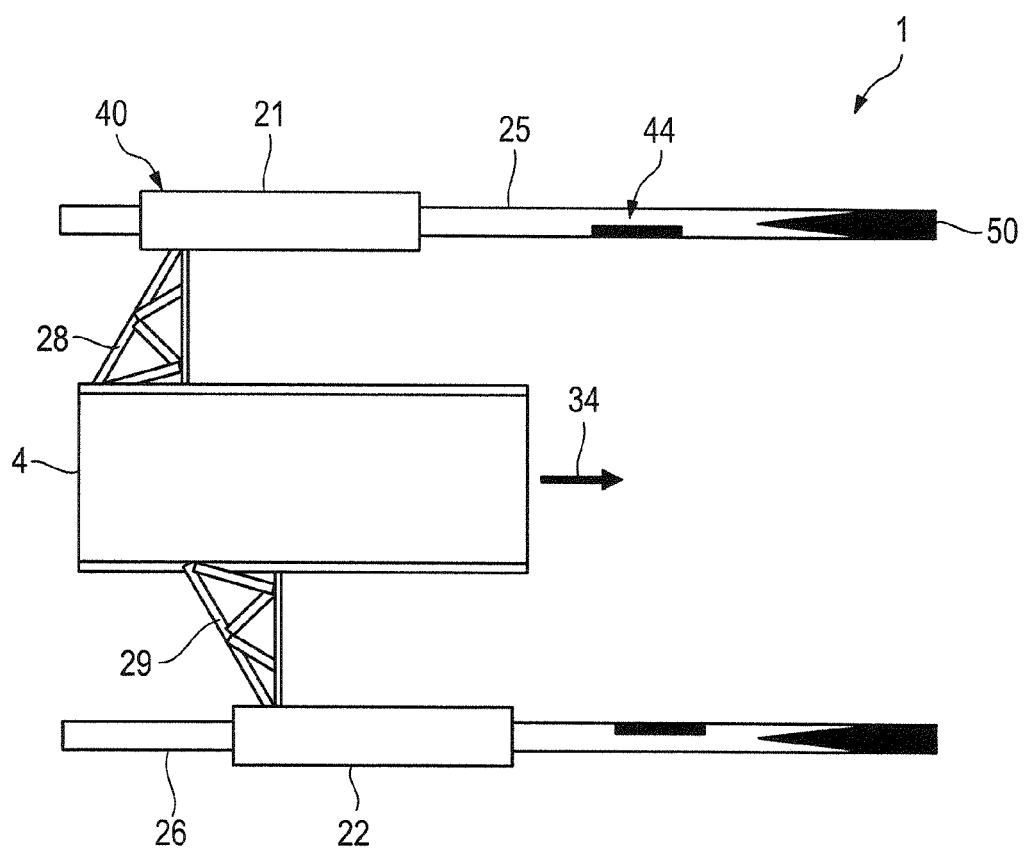
FIG. 2 is a simplified plan view of the crash simulation system from FIG. 1.

FIGS. 1 and 2 show different views of a crash simulation system 1 that is used to carry out vehicle safety tests. The system 1 uses a parallel carriage 4 to simulate a collision. More particularly, a vehicle body containing dummies is positioned on the parallel carriage 4 and is subjected to acceleration, as occurs in the case of a real blocking collision. Due to this acceleration, the parallel carriage 4 also is called an acceleration carriage. Analogously, the crash simulation system 1 also is called an acceleration system. Deceleration systems with deceleration carriages also exist.

The movements that are to be observed and analyzed take place in approximately one tenth of a second. The human eye cannot detect and identify processes in this short time in a detailed manner. Therefore, cameras, preferably high-speed cameras, are used and break down the process to be examined generally in milliseconds. Cameras of conventional crash simulation systems are moved or shot together with the parallel carriage. If the cameras are attached to the parallel carriage with the aid of extension arms, the acceleration force over the extension arms may have a negative effect on the recording quality of the cameras.

The parallel carriage 4 is guided to be moved in a translatory manner, for example with the aid of guide rails 5, 6 and/or a guide device 8. The movement direction of the parallel carriage 4 is indicated in FIG. 2 by an arrow 34. In FIG. 1, the parallel carriage 4 moves perpendicular to the plane of the drawing. A motor vehicle or a motor vehicle body 10 is indicated on the parallel carriage 4. The motor vehicle body 10 first is accelerated, and then slowly braked by means of the parallel carriage 4 during the crash simulation.

Interesting changes to the motor vehicle 10 are detected with the aid of three cameras 11, 12, 13 each of which is arranged one to two meters from the motor vehicle 10 at the sides of and above the motor vehicle. The distances between the cameras 11 to 13 and the motor vehicle 10 are required to be able to clearly reproduce the observation area in the motor vehicle or the vehicle body 10 under test.

The cameras 11 to 13 preferably are guided in different guidance systems by separate camera carriages 21, 22, 23. The cameras 11 to 13, like the parallel carriage 4, are mounted on a solid, stable, vibration-free frame that is placed approximately 1.5 to 1.8 meters next to the track of the parallel carriage 4 or is suspended approximately 1.5 to 1.8 meters above the track.

The movement path of the parallel carriage 4 has a length of approximately 30 meters in total, with the event to be observed taking place over the first three meters. The remainder of the distance is purely a braking distance for the parallel carriage 4 carrying the vehicle body 10. The braking of the parallel carriage 4 must not be implemented too sharply to prevent undesired slipping of the dummies or of the unit under test.

The camera carriages 21 to 23 are guided in a separate camera guides 25, 26, 27 independently of the parallel carriage 4. The guides 25, 26, 27 preferably are of vibration-free, play-free and low-friction design. The separate camera guides 25 to 27 ensure that each camera 11 to 13 with the camera carriage 21 to 23 has only one degree of freedom of movement in the direction of movement of the parallel carriage 4.

The camera carriages 21 to 23 can be coupled individually to the parallel carriage 4 by linkages 28, 29, 30. Temporary coupling of the camera carriages 21 to 23 to the parallel carriage 4 ensures, in a simple manner, that the cameras 11 to 13 execute their movement in the firing direction temporally and mechanically synchronously with the parallel carriage 4 in the movement section to be examined on their respective guide 25 to 27. The camera carriages 21 to 23 preferably are coupled to the parallel carriage 4 when the movement of the parallel carriage starts to ensure that the camera carriages 21 to 23 undergo the same acceleration as the parallel carriage 4 when an experiment is started.

FIG. 2 indicates a mechanical coupling device 40 by means of which the camera carriage 21 can be coupled mechanically to the parallel carriage 4 by the linkage 28. The drive power of the camera carriages 21 to 23 is drawn from the parallel carriage 4. The thrust force that occurs during acceleration is transmitted from the parallel carriage 4 to the camera carriages 21 to 23 by the linkages 28 to 30, which preferably are highly rigid. The rigidity of the coupling linkages 28 to 30 is critical for the quality of the horizontal synchronicity of movement. The required rigidity preferably is provided by lightweight, high-strength materials, for example of composite construction.

The camera guides 25 to 27 can be substantially shorter than the guide of the parallel carriage 4 since the camera carriages 21 to 23 comprising the cameras 11 to 13 can be braked with the same acceleration with which they are accelerated. After the common acceleration phase and an observation distance of, for example, two meters, the camera carriages 21 to 23 can be decoupled from the parallel carriage 4 with the aid of a decoupling device 44.

Decoupling can be performed by a gently rising curved track along which a decoupling bar is guided. After a short safety zone of approximately 0.2 meters, the coupling linkages 28 to 30 and the associated camera carriages 21 to 23 are completely decoupled from the parallel carriage 4 and can be braked independently of the parallel carriage 4 with the aid of a brake device 50. The linkages 28 to 30 remain on the parallel carriage 4 and coupling or decoupling takes place between the linkages 28 to 30 and the associated camera carriages 21 to 23.

Figure 3:
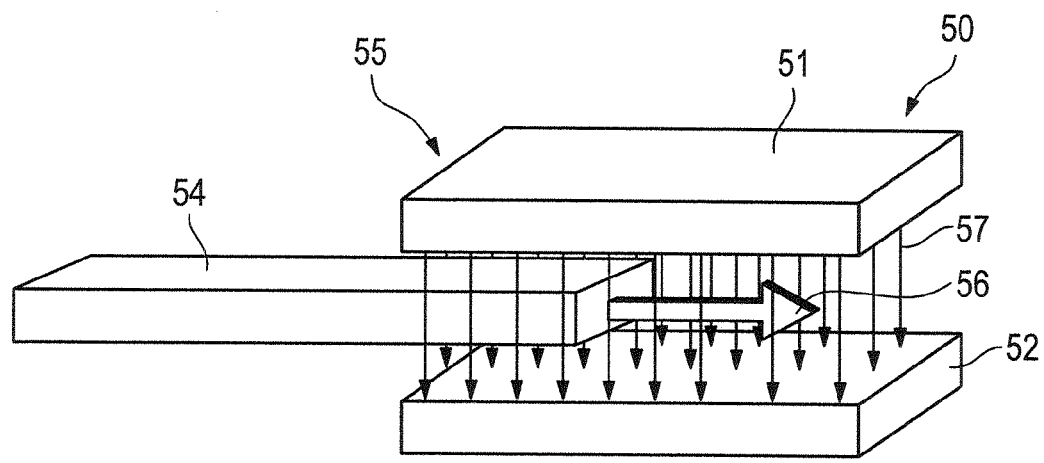
FIG. 3 is a simplified illustration of a brake device according to the invention.
Figure 4:
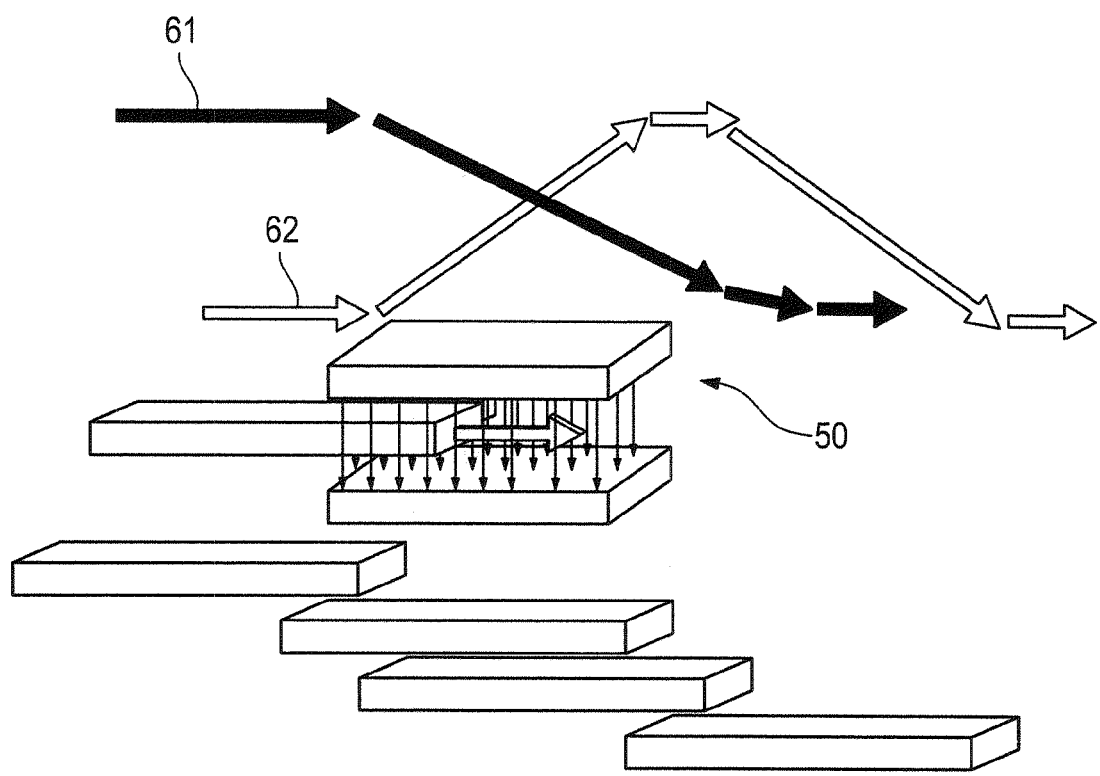
FIG. 4 is a speed and braking force profile for the brake device of FIG. 3.

Each camera carriage 21 to 23 has an associated brake device 50, as illustrated in FIGS. 3 and 4, for braking the respective camera carriage 21 to 23. The camera carriages 21 to 23 are decoupled from the parallel carriage 4, which also is called the main carriage, before braking. The camera carriages 21 to 23 with the cameras 11 to 13 mounted thereon then are braked over a short distance with the aid of the brake devices 50.

The brake device 50 illustrated in FIGS. 3 and 4 comprises a linear eddy current brake 55. The eddy current brake 55 provides the advantage that the braking force takes effect in a contactless manner, and therefore no undesired initial shock with harmful brief acceleration peaks can be produced.

The eddy current brake 55 comprises two plate-like permanent magnets 51 and 52 arranged parallel to one another. The brake device 50 also comprises a plate-like brake element 54 formed from an electrically conductive metal, such as copper, aluminum and/or steel.

Eddy currents are generated in the brake element 54 when the brake element 54 is moved a short distance through the space between the two permanent magnets 51 and 52, as indicated by a large horizontal arrow 56. These eddy currents in turn build up a magnetic field around themselves, thereby resulting in a force effect against the magnetic field of the permanent magnets 51, 52, as indicated by vertical arrows 57.

The forces from the permanent magnetic field 57 and the magnetic fields induced by eddy currents, of the rapidly moving brake element 54 act against one another, and therefore the moving brake element 54 is braked and its speed is reduced.

The speed profile 61 and the braking force profile 62 are indicated by arrows in FIG. 4. The relationship between speed and braking force is not proportional. If the speed tends toward zero, no eddy currents and therefore no counteracting force magnetic field are induced any longer. Therefore, the speed cannot be braked completely down to zero with the aid of the eddy current brake 55.

A hydraulic brake that has a hydraulic impact damper with a minimal braking power preferably is provided to bring the brake element 54 to a complete stop.

FIG. 4 indicates that the brake element 54, which is designed as an electrically conductive plate, moves into the intermediate space between the two permanent magnets 51 and 52. Next, only a small end of the brake element 54 is located in the permanent magnet field region 57. Therefore, no large eddy currents and consequently no large braking forces can be achieved. The further the metal plate penetrates between the permanent magnets 51 and 52, the stronger the eddy currents, and therefore growing opposing magnetic fields are produced.

A moderate force exists initially, but then rises rapidly and exerts a corresponding braking force effect acts on the mass of the brake element 54 which is to be braked. The brake element 54 preferably is connected firmly to one of the camera carriages 21 to 23. The permanent magnets 51 and 52 can be arranged laterally next to the camera guides 25 to 27. However, it is also possible to combine one of the permanent magnets with the camera guides 25 to 27.

What is claimed is:
1. A crash simulation system comprising:
a parallel carriage guided to move in a translatory manner; and
at least one camera having a camera carriage and an associated brake device that includes a contactless brake with at least one electrically conductive metal brake element associated with the camera carriage and movable between two permanent magnets.

2. The crash simulation system of claim 1, wherein the contactless brake is a linear eddy current brake.

3. The crash simulation system of claim 1, further comprising a decoupling device connected in front of the brake device.

4. A crash simulation system, comprising:
a parallel carriage guided to move in a translatory manner;
at least one camera having an associated brake device that includes a contactless brake; and
a mechanical or a hydraulic supplemental brake in addition to the contactless brake.

5. The crash simulation system of claim 4, wherein the supplemental brake comprises at least one hydraulic impact damper.

6. A crash simulation system comprising:
at least one rail;
a carriage movable along the rail and configured for carrying a motor vehicle or a motor vehicle body;
at least one camera coupled to the carriage;
means for decoupling the camera from the carriage at a selected position along the rail;
a contactless brake for slowing the camera that has been decoupled from the carriage, the contactless brake being a linear eddy current brake having at least one electrically conductive metal brake element associated with the carriage and movable between two permanent magnets; and
a mechanical or a hydraulic supplemental brake for stopping movement of the camera that has been slowed by the contactless brake.

7. A method for operating a crash simulation system, comprising:
accelerating a carriage and at least one camera coupled to the carriage, the carriage having at least one electrically conductive metal brake element; and
moving the electrically conductive metal brake element between two permanent magnets for generating eddy currents in the electrically conductive metal brake element and thereby applying contactless braking to the camera.

8. The method of claim 7, further comprising decoupling the camera from the carriage before applying the contactless braking.

9. The method of claim 8, further comprising applying a mechanical or a hydraulic supplemental brake to the camera after applying the contactless braking.

* * * * *